United States Patent
Dasgupta et al.

(10) Patent No.: US 12,490,185 B2
(45) Date of Patent: Dec. 2, 2025

(54) DYNAMIC WIFI TRANSMIT POWER REDUCTION TO CONSERVE DEVICE POWER IN A MIXED 5G/WIFI SERVICE AREA

(71) Applicant: Cisco Technology, Inc., San Jose, CA (US)

(72) Inventors: Sukrit Dasgupta, Farrington, MA (US); Federico Lovison, Fontanelle (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 318 days.

(21) Appl. No.: 18/356,736

(22) Filed: Jul. 21, 2023

(65) Prior Publication Data

US 2025/0031142 A1     Jan. 23, 2025

(51) Int. Cl.
| | |
|---|---|
| *H04W 52/02* | (2009.01) |
| *H04W 24/02* | (2009.01) |
| *H04W 24/10* | (2009.01) |
| *H04W 72/542* | (2023.01) |

(52) U.S. Cl.
CPC ....... *H04W 52/0203* (2013.01); *H04W 24/02* (2013.01); *H04W 24/10* (2013.01); *H04W 72/542* (2023.01)

(58) Field of Classification Search
CPC .......... H04W 52/0203; H04W 72/542; H04W 24/02; H04W 24/10
See application file for complete search history.

(56) References Cited

U.S. PATENT DOCUMENTS

| | | | |
|---|---|---|---|
| 10,536,897 B2* | 1/2020 | Nader | H04W 24/02 |
| 10,912,089 B2* | 2/2021 | Nader | H04W 4/70 |
| 2020/0359285 A1 | 11/2020 | Choi et al. | |
| 2021/0105807 A1* | 4/2021 | Li | H04W 72/20 |
| 2021/0219238 A1 | 7/2021 | Sharma et al. | |
| 2021/0400558 A1* | 12/2021 | Keränen | H04W 28/0247 |
| 2022/0030525 A1 | 1/2022 | Chincholi et al. | |
| 2022/0124009 A1 | 4/2022 | Metsch et al. | |
| 2022/0337481 A1 | 10/2022 | Guim Bernat et al. | |

OTHER PUBLICATIONS

Ali Hassan Sodhro et al, "5G-Based Transmission Power Control Mechanism in Fog Computing for Internet of Things Devices," www.mdpi.com/journal/sustainability, Apr. 19, 2018.

* cited by examiner

*Primary Examiner* — Chandrahas B Patel
(74) *Attorney, Agent, or Firm* — Baker Botts L.L.P.

(57) ABSTRACT

In one embodiment, a method can receive transmission metadata associated with a plurality of devices within an Internet of Things (IoT) network. The method can use a transmission sensing component (TSC) to measure transmission energy cost for each of the plurality of devices over a time period using the transmission metadata. The method can use a central compute engine (CCE) and the transmission energy cost for each of the plurality of devices to determine a plurality of transmission features associated with the plurality of devices having a transmission energy cost that is minimized. The method can use a transmission scheduling engine (TSE) and the plurality of transmission features to generate a transmission mode schedule to reduce a transmission energy cost for the plurality of devices within the IoT network. The method can adjust a transmission mode associated with the plurality of devices based on the transmission mode schedule.

20 Claims, 3 Drawing Sheets

DYNAMIC WIFI TRANSMIT POWER REDUCTION TO CONSERVE DEVICE POWER IN A MIXED 5G/WIFI SERVICE AREA

TECHNICAL FIELD

The present disclosure relates generally to dynamic transmit power control (DTPC) for a plurality of Internet of Things (IoT) devices, and more particularly, to determining transmission energy based on energy consumption for the plurality of IoT devices.

BACKGROUND

IoT networks may include many devices that need to conserve power in order to operate for a long period of time without power replenishment. With the advent of 5G and Wi-Fi technologies, these devices have multiple connectivity options to export telemetry from their sensors. Because of the large number of devices in the IoT networks, it is difficult to develop an efficient power saving method by managing connectivity and transmissions through cellular or wireless.

DESCRIPTION OF EXAMPLE EMBODIMENTS

Overview

Figure 1:
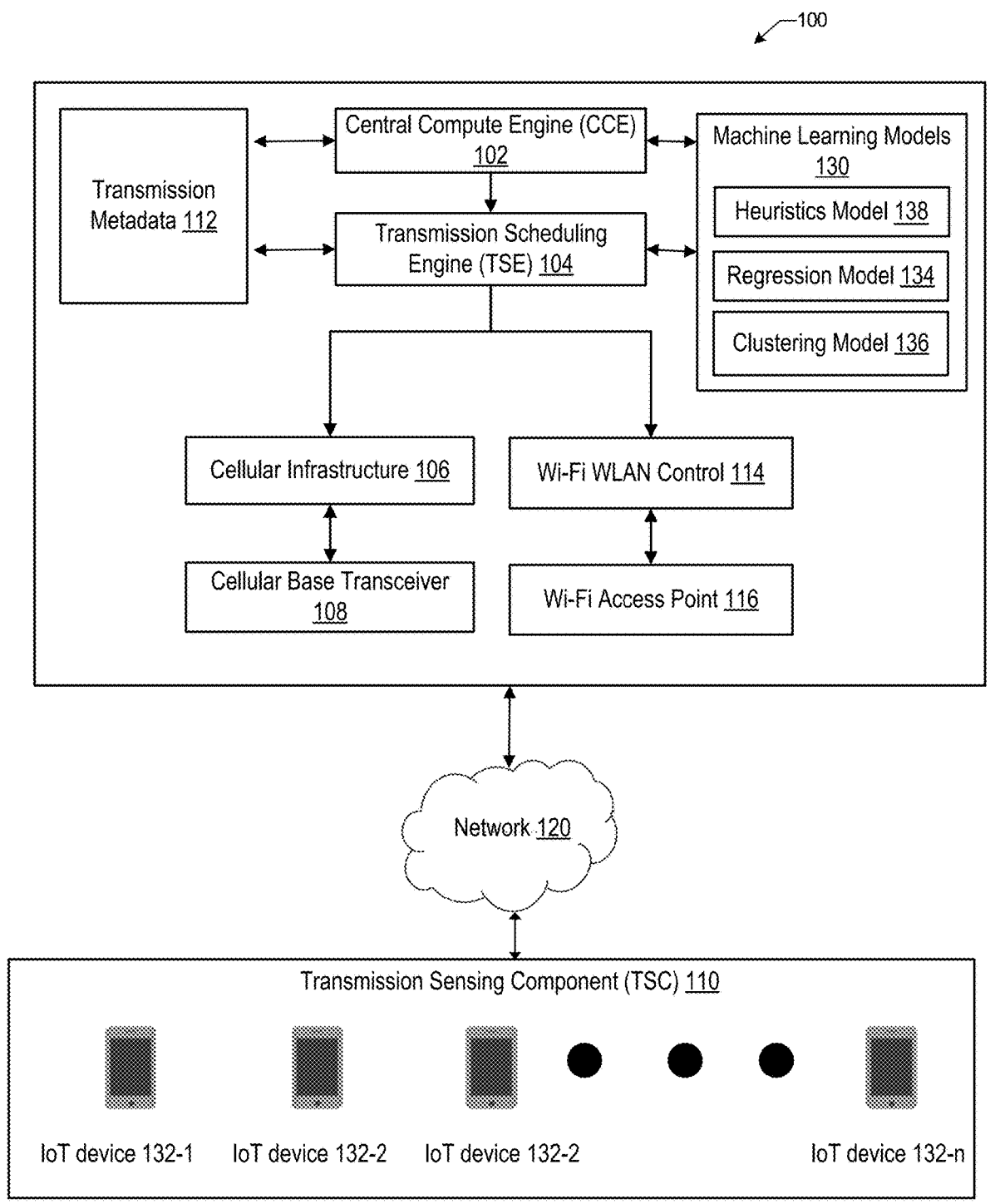
FIG. 1 illustrates an example transmission energy manager for use in a product.

In one or more embodiments, an apparatus may comprise one or more processors, and one or more computer-readable non-transitory storage media coupled the to one or more of the processors. The one or more computer-readable non-transitory storage media may comprise instructions operable when executed by one or more of the processors to cause one or more components of the apparatus to perform operations to receive transmission metadata associated with a plurality of devices within an IoT network. The apparatus is configured to use a transmission sensing component (TSC) and the transmission metadata to measure transmission energy cost for each of the plurality of devices over a time period using the transmission metadata. The apparatus is configured to use a central compute engine (CCE) to determine a plurality of transmission features associated with the plurality of devices having a transmission energy cost that is minimized. The apparatus is configured to use a transmission scheduling engine (TSE) to generate a transmission mode schedule to reduce a transmission energy cost for the plurality of devices within the IoT network. The apparatus is configured to adjust the transmission mode associated with the plurality of devices based on the transmission mode schedule.

In one or more embodiments, a method, by an apparatus, may receive transmission metadata associated with a plurality of devices within an IoT network. The method can use a transmission sensing component (TSC) and the transmission metadata to measure transmission energy cost for each of the plurality of devices over a time period using the transmission metadata. The method can use a central compute engine (CCE) to determine a plurality of transmission features associated with the plurality of devices having a transmission energy cost that is minimized. The method can use a transmission scheduling engine (TSE) to generate a transmission mode schedule to reduce a transmission energy cost for the plurality of devices within the IoT network. The method can adjust the transmission mode associated with the plurality of devices based on the transmission mode schedule.

In one or more embodiments, one or more computer-readable non-transitory storage media may embody software that is operable, when executed by a processor, to receive transmission metadata associated with a plurality of devices within an IoT network. The software may be operable, when executed, to use a transmission sensing component (TSC) and the transmission metadata to measure transmission energy cost for each of the plurality of devices over a time period using the transmission metadata. The software may be further operable, when executed, to use a central compute engine (CCE) to determine a plurality of transmission features associated with the plurality of devices having a transmission energy cost that is minimized. The software may be further operable, when executed, to use a transmission scheduling engine (TSE) to generate a transmission mode schedule to reduce a transmission energy cost for the plurality of devices within the IoT network. The software may be further operable, when executed, to adjust the transmission mode associated with the plurality of devices based on the transmission mode schedule.

Technical advantages of certain embodiments of this disclosure may include one or more of the following. Certain apparatuses and methods described herein may select a transmission mode, such as Wi-Fi or 5G cellular, to minimize transmit energy consumption for a plurality of devices within an IoT network. The apparatus and the method can use an improved Dynamic transmit-power control (DTPC) scheme based on one or more machine learning models to determine the transmission mode with the minimum power for each of the plurality of IoT devices provided that the link is not overloaded. Certain embodiments may provide a schedule for beamforming technology to focus on specific IoT devices only based on requirements for gathering data.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Dynamic transmit-power control (DTPC) is a spectrum management mechanism used to improve spectral efficiency and reduce unwanted interference for wireless devices in wireless local area networks (WLANs). In particular. DTPC can be performed to dynamically determine transmit power levels for the devices within the IoT networks. For example, DTPC can use signal to noise ratio (SNR) information to determine the transmit power for an IoT device. As another example, DTPC can exchange information between transmitters and receivers within the IoT network. It becomes possible to use DTPC to reduce energy cost by reducing transmit power with minimal co-channel and adjacent channel interference.

In general, a plurality of low powered devices, such as narrowband (NB) user equipment (UEs), are connected through many access points (APs) within an IoT network using short-lived UE connections. The plurality of low powered devices may include mobile and non-mobile computing devices, such as mobile phone electronic devices, tablet computer electronic devices, laptop computer electronic devices, pagers, desktop computers, wireless handsets, drones, cameras, touch sensors, motion detection sensors, infrared sensors, etc. The access point may be a wireless network device that acts as a portal to provide Wi-Fi or cellular signals for the plurality of low powered devices to connect to a WLAN in an office or a building. In particular, the cellular signal can be related to 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Thus, access points may be used to extend wireless coverage of an existing network for multiple users.

In an embodiment, a cellular system include a plurality of radio cells served by serving base stations. The cellular system usually provides poor indoor coverage as it does not propagate into building. Each of the plurality of IoT devices may communicate with both a cellular system and the wireless system with different transmission power patterns. However, it is difficult to develop a power saving mechanism in actual 802.11 deployment because of various power configurations for both Wi-Fi and cellular systems. A control system of the IoT network can be designed to run each access point to transmit wireless or cellular signals to the plurality of IoT devices by minimizing transition power. In particular, the control system of the IoT network may apply a DTPC scheme to interchangeably select transmission modes over Wi-Fi or cellular based on energy consumption profiles computed during transmission. Therefore, the IoT network may select the most power efficient transmission mode to minimize transmission energy.

FIG. 1 illustrates an example transmission energy manager 100 for use in a product. In embodiments, the transmission energy manager 100 may include central compute engine (CCE) 102, transmission scheduling engine (TSE) 104, and machine learning models 130. The transmission energy manager 100 may be communicatively coupled to network 120 to receive transmission metadata associated with a plurality of IoT devices, such as IoT devices 132 (132-1, 132-2, 132-n). Network 120 broadly represents any wireline or wireless network, using any of satellite or terrestrial network links, such as public or private cloud on the Internet, local area networks (LANs), metropolitan area networks (MANs), wide area networks (WANs), a public switched telephone network (PSTN), campus network, internetworks, or combinations thereof. The network 120 may include or comprise the public internet and networked server computers that implement Web2 and/or Web3 technologies. The network 120 may comprise or support intranets, extranets, or virtual private networks (VPNs). The network 120 may also comprise a public switched telephone network (PSTN) using digital switches and call forwarding gear. The network 120 may also comprise a public switched telephone network (PSTN) using digital switches and call forwarding gear.

In an embodiment, the transmission sensor component (TSC) 110 resides on the IoT device transmitter. The transmission sensor component 110 is configured to measure the amount of energy consumed to transmit data on every transmission associated with a plurality of IoT devices 132. For example, the transmission sensing component 110 may track corresponding transmission related metadata of different transmission parameters, such as received signal strength indicator (RSSI), signal noise ratio (SNR), interference, throughput, etc. As another example, the transmission sensing component 110 may measure energy consumption for wireless and cellular transmission modes of connectivity for the plurality of IoT devices 132. RSSI measures how well an IoT device may hear a signal from an access point or router as an indication of the power level being received by the receiver to determine if there is enough signal to receive a good wireless connection. For example, a higher RSSI value indicates a stronger signal. SNR measures the noise level in decibels (dB) based on the ratio between a level of a desired signal to a level of background noise. Interference measures a signal disruption in a telecommunication. Interference usually travels along a communication channel between source and receiver. For example, interference may be associated with an addition of unwanted signals, such as noise, to a desired and useful signal. Throughput measures the amount of network data that actually travels successfully across a network from a source to a destination in a given time period for a IoT device, such as a router. The throughput is typically measured in bits per second (bps), megabits per second (Mbpts), or gigabits per second (Gbps).

In an embodiment, the transmission sensor component 110 is configured to share the corresponding transmission related metadata periodically with a central networking infrastructure component, such as the transmission energy manager 100, of the IoT network. The transmission sensor component 110 may measure energy consumption based on the corresponding transmission related metadata on alternative transmission modes, such as Wi-Fi or cellular. For example, the transmission sensor component 110 may share the corresponding transmission related metadata separately or piggybacked on application traffic. As a result, the transmission sensor component 110 may determine different transmission parameters over a long period of time and across the complete IoT network. The different transmission parameters may be acquired from every IoT device in the network.

In an embodiment, the transmission sensor component 110 is configured to measure transmission energy cost for each of the plurality of IoT devices using the transmission related metadata. The transmission sensor component 110 may provide visibility into trends of the transmission energy cost and form an accurate picture of transmission energy costs incurred in different parts of the IoT network for determining longevity of the IoT network in terms of sensing. In particular, the transmission related metadata may be transmitted to the transmission energy manager 100 and stored in a database, such as transmission metadata 112.

In an embodiment, the central compute engine 102 represents a central entity to access the transmission metadata 112. The central compute engine 102 is configured to apply telemetry processing and one or more machine learning models 130 to analyze energy consumption patterns associated with the transmission metadata 112. In particular, the central compute engine 102 may correlate the transmission metadata 112 with geolocation of wireless infrastructure, such as the plurality of IoT devices, of the IoT network. For example, the central compute engine 102 may utilize heuristics model 138 to analyze the correlation of the transmission metadata 112 with the geolocation of wireless infrastructure. As another example, the central compute engine 102 may utilize a first machine learning model, such as regression model 134, to predict the transmission energy cost for each of the plurality of devices within the IoT network. As another example, the central compute engine 102 may utilize a second machine learning model, such as clustering model 136, to determine the plurality of transmission features associated with the subset of the plurality of devices. As a result, the central compute engine 102 may determine a subset of the plurality of IoT devices that has more transmission energy consumption above a predetermined threshold and a corresponding time when the subset of the plurality of IoT devices has more transmission energy consumption above a predetermined threshold. The central compute engine 102 may determine a plurality of transmission features associated with the subset of the plurality of devices based on the transmission energy cost, such as geographic location, IoT device, received signal strength indicator (RSSI), signal noise ratio (SNR), interference, throughput, etc. Based on the plurality of transmission features, the central compute engine 102 may determine areas and corresponding optimal times to maximize information transmission and minimize energy consumption for a particular transmission model, such as Wi-Fi or wireless, within the IoT network.

In an embodiment, the heuristics model 138 may include predetermined criteria to determine the plurality of transmission features by calculating a likelihood based on the transmission metadata 112. The heuristics model 138 may be applied to assess key characteristics to minimize transmission energy consumption. The heuristics model 138 may be predetermined using previous experience or machine-learning algorithms through the analysis of a wide variety of transmission metadata 112 over a period of time. For example, the heuristics model 138 may include a genetic algorithm and simulated annealing (GA SA) meta-heuristics model to minimize an objective function based on transmission energy consumption for the plurality of devices in the IoT network. Generic algorithm is an effective meta-heuristics algorithm that is widely used for solving convoluted optimization problems by mimicking the biological evolution of a computing model to find the possible optimal solution using a selection function, a mutation function, and a crossover function. The selection function may choose parent chromosomes for next generation based on scaled values from the objective function. The mutation function may introduce small random variations between individual chromosomes in the population to provide genetic diversity and enable the genetic algorithm to search in a broad solution space. The crossover function may combine two individual chromosomes to form a new chromosome for next generation. The simulated annealing method is based on the principle of heating a solid substance until it reaches melting point and slowly cools down the temperature of the liquid substance from its highest temperature until it converges to a steady and frozen state. From an optimization perspective, annealing allows the substance to explore, escape from a local minimum, and at the end, settle on a global minimum. As a result, the GA SA meta-heuristics model may solve the transmission energy consumption optimization problem to determine minimum energy consumed in the IoT network.

In an embodiment, the regression model 134 may be performed to predict energy consumption and lifetime for each of the plurality of IoT devices 132. For example, the regression model 134 may be a linear or non-linear function to represent the transmission metadata 112 for the plurality of IoT devices 132. In particular, the regression model 134 may be used to extract a plurality of relation factors, such as coefficients for a multi-dimensional fitting curve, and to derive a transmission energy consumption prediction with predetermined accuracy and precision for wireless and cellular transmission modes of connectivity for the plurality of IoT devices 132.

In an embodiment, the clustering model 136 may be generated by an unsupervised machine learning algorithm, such as k-means, DBSCAN, self-organizing map, principal component analysis, etc. The clustering model 136 may be applied to perform the classification and to determine multiple natural clusters among the input transmission metadata 112 for wireless and cellular transmission modes of connectivity for the plurality of IoT devices 132. For example, the k-means algorithm may start with k random cluster center points and then solve the optimization problem by minimizing an objective function by assigning data points to the nearest cluster center. Once this assignment is done, the k-means algorithm recomputes the cluster center. This process continues until there is not much change in the cluster assignment. As a result, the clustering model 136 may be applied to determine the subset of the plurality of IoT devices where more power is consumed during transmission and identifies the times during which it happens.

In an embodiment, the transmission scheduling engine 104 is a center network infrastructure entity that is configured to determine a schedule to reduce a transmission energy cost for a particular transmission mode for the plurality of devices within the IoT network. The transmission scheduling engine 104 may share the schedule with cellular infrastructure 106 and Wi-Fi WLAN control 114. For example, the schedule may contain detailed information of when and which access points on the wireless network, such Wi-Fi AP 116, reduce their transmission power so that the subset of the plurality of IoT devices default to using 5G transmission. For example, the schedule may contain detailed information of when and which access points on the cellular network, such cellular base transceiver station (BTS) 108, reduce their transmission power so that the subset of the plurality of IoT devices default to using cellular transmission. As another example, the schedule may contain detailed information of when and which subset of the plurality of IoT device may reduce transmission power to transmit using cellular network or wireless network. As a result, the transmission scheduling engine 104 may use the schedule to detect a first subset of IoT devices that spend a lot of energy trying to transmit to access points using the Wi-Fi transmission to transmit using the cellular transmission The transmission scheduling engine 104 may determine a cellular transmission mode for the first subset of IoT devices to rely on 5G cellular for their transmissions. Likewise, the transmission scheduling engine 104 may use the schedule to determine a second subset of IoT devices that spend a lot of energy trying to transmit to access points using the cellular transmission to transmit using the wireless transmission. The transmission scheduling engine 104 may identify Wi-Fi transmission mode so the second subset of IoT devices may rely on Wi-Fi for their transmissions.

In an embodiment, the transmission scheduling engine 104 is configured to use the schedule for beamforming technology to focus on specific IoT devices based on requirements for gathering data. The schedule may also be shared with the plurality of IoT devices, so every IoT device knows what the window of transmission will be for each of the plurality of IoT devices. The transmission scheduling engine 104 is configured to use the schedule to share the same information with 5G providers, such as a public 5G infrastructure and/or private 5GaaS infrastructure. Transmitters of the 5G providers may reduce transmit power so that the plurality of IoT devices may just rely on Wi-Fi for their transmissions. As a result, the schedule may be used to adjust the transmission mode associated with the subset of the plurality of devices to allow both the network infrastructure and the IoT devices to conserve energy and keep the sensing functionality prolonged without energy replenishment.

Although FIG. 1 describes and illustrates particular components, devices, or systems carrying out particular actions, this disclosure contemplates any suitable combination of any suitable components, devices, or systems carrying out any suitable actions. For example, the central compute engine 102 and the transmission scheduling engine 104 may be combined in a single component as a central network infrastructure entity of the transmission energy manager 100. As another example, the transmission metadata 112 may be stored in central compute engine 102 or transmission scheduling engine 104. As another example, the machine learning models 130 may be stored in the transmission scheduling engine 104.

Figure 2:
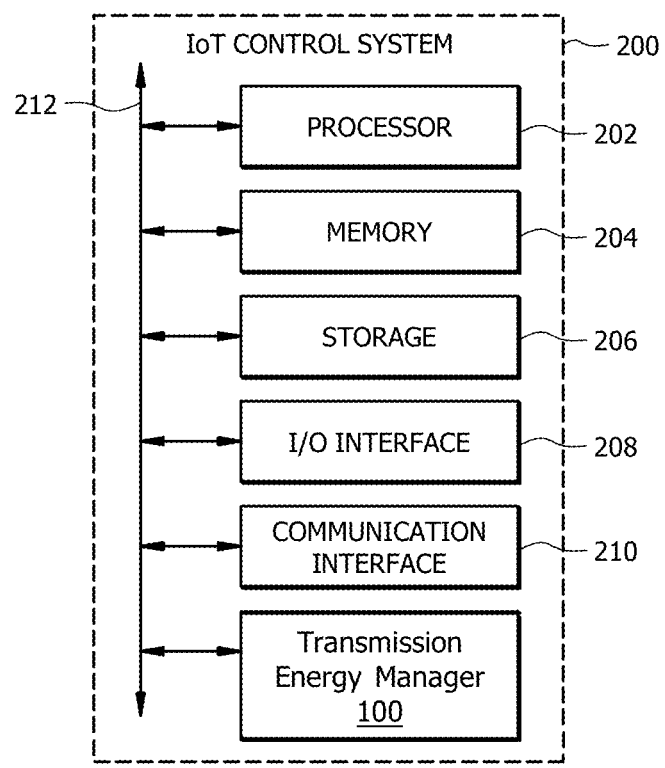
FIG. 2 illustrates an example IoT control system.

FIG. 2 illustrates an example IoT control system 200. In particular embodiments, one or more IoT control systems 200 perform one or more steps of one or more methods described or illustrated herein. In particular embodiments, one or more IoT control systems 200 provide functionality described or illustrated herein. In particular embodiments, software running on one or more IoT control systems 200 performs one or more steps of one or more methods described or illustrated herein or provides functionality described or illustrated herein. Particular embodiments include one or more portions of one or more IoT control systems 200. Herein, reference to a transmission energy manager may encompass a computer or a computing device, and vice versa, where appropriate. Moreover, reference to a transmission energy manager may encompass one or more computer systems, where appropriate. Further, the transmission energy manager 100 in FIG. 1 may be incorporated into the illustrated IoT control system 200 or IoT control system 200 may represent the transmission energy manager 100. With reference to the present disclosure, the IoT control system 200 may be the aforementioned product incorporating the transmission energy manager 100, as described above with respect to FIG. 1. As such, "product" and "IoT control system 200" may herein be used interchangeably.

This disclosure contemplates any suitable number of IoT control systems 200. This disclosure contemplates IoT control system 200 taking any suitable physical form. As example and not by way of limitation, IoT control system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, IoT control system 200 may include one or more IoT control systems 200; be unitary or distributed; span multiple locations; span multiple machines; span multiple data centers; or reside in a cloud, which may include one or more cloud components in one or more networks. Where appropriate, one or more IoT control systems 200 may perform without substantial spatial or temporal limitation one or more steps of one or more methods described or illustrated herein. As an example and not by way of limitation, one or more IoT control systems 200 may perform in real time or in batch mode one or more steps of one or more methods described or illustrated herein.

One or more IoT control systems 200 may perform at different times or at different locations one or more steps of one or more methods described or illustrated herein, where appropriate.

In particular embodiments, IoT control system 200 includes a processor 202, memory 204, storage 206, an input/output (I/O) interface 208, a communication interface 210, and a bus 212. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, IoT control system 200 may load instructions from storage 206 or another source (such as, for example, another IoT control system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to IoT control system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between IoT control system 200 and one or more I/O devices. IoT control system 200 may include one or more of these I/O devices, where appropriate. One or more of these I/O devices may enable communication between a person and IoT control system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between IoT control system 200 and one or more other IoT control systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 210 for it. As an example and not by way of limitation, IoT control system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, IoT control system 200 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a Long-Term Evolution (LTE) network, or a 5G network), or other suitable wireless network or a combination of two or more of these. IoT control system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of IoT control system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, IoT control system 200 may be configured to initiate a telemetry processing process (see FIG. 3) in order to receive real-time transmission related metadata on alternative transmission modes, such as Wi-Fi or cellular from a plurality of IoT devices 132. In an embodiment, IoT control system 200 may be configured to measure transmission energy cost for each of the plurality of devices over a time period using the transmission metadata. In an embodiment, IoT control system 200 may be configured to determine a plurality of transmission features associated with a subset of the plurality of devices based on the transmission energy cost. In an embodiment, IoT control system 200 may be configured to generate a schedule to reduce a transmission energy cost for a particular transmission mode for the plurality of devices within the IoT network. In an embodiment, IoT control system 200 may be configured to adjust the transmission mode associated with the subset of the plurality of devices based on the schedule.

Figure 3:
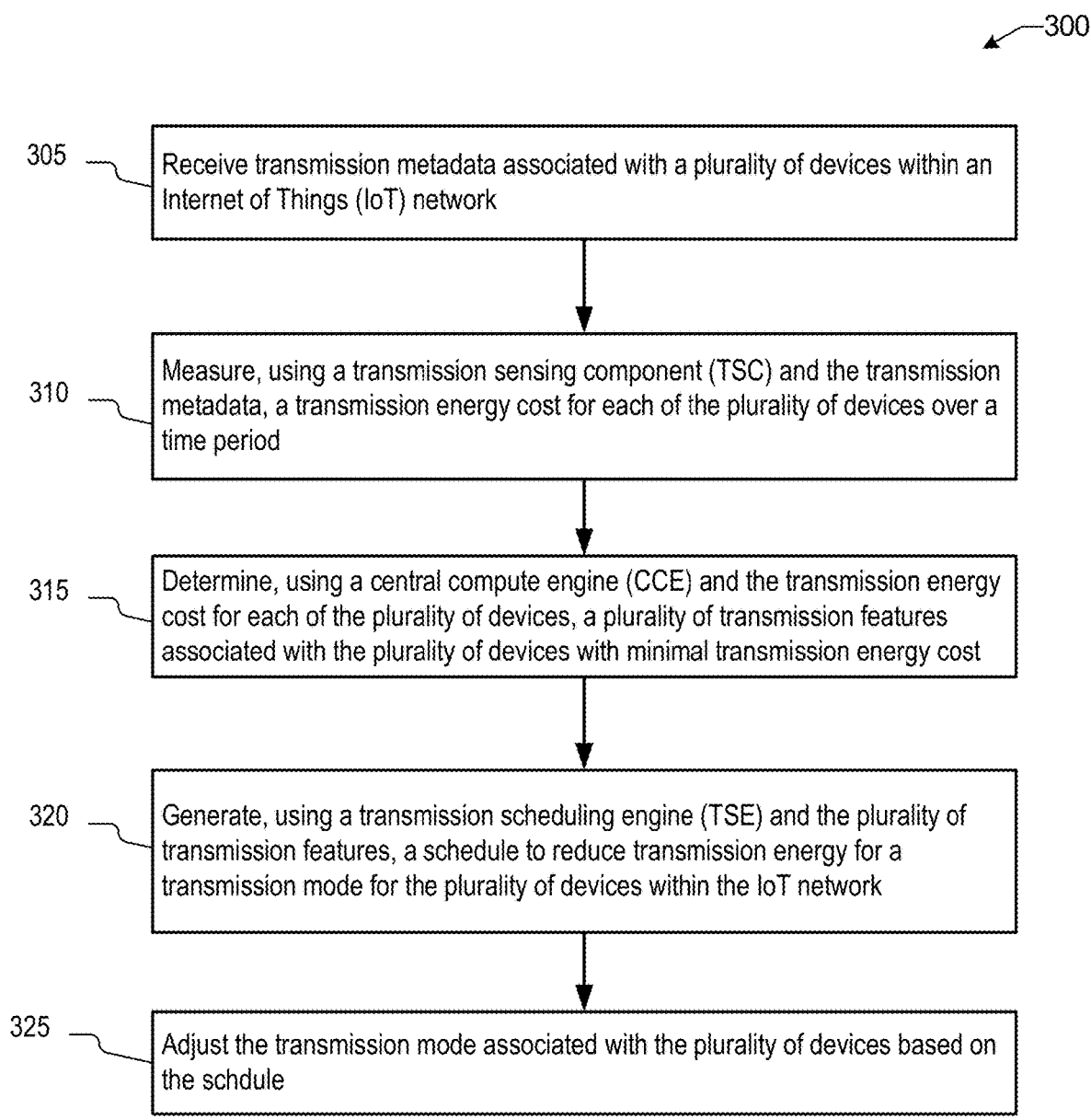
FIG. 3 illustrates an example method for determining transmission modes based on energy consumption for a plurality of IoT devices.

FIG. 3 illustrates an example method 300 to use transmission energy manager 100 (referring to FIG. 1) of IoT control system 200 (referring to FIG. 2) to determine transmission modes over Wi-Fi or cellular based on energy consumption computed during transmissions for a plurality of devices within an IoT network. The method 300 may begin at step 305 where the transmission energy manager 100 may receive transmission metadata associated with a plurality of devices within the IoT network. The transmission metadata may include RSSI, SNR, interference, throughput for wireless and cellular modes of connectivity. In particular, the transmission energy manager 100 may periodically share the transmission metadata with a central networking infrastructure component, such as TSC, to generate a whole picture of different transmission parameters over a long time period.

At step 310, the transmission energy manager 100 may use a transmission sensing component to measure transmission energy cost for each of the plurality of devices over a time period using the transmission metadata. For example, the transmission energy manager 100 may determine a relationship between the transmission energy cost and the transmission metadata based on RSSI, SNR, interference, throughput, and transmission mode. As another example, the transmission energy manager 100 may use telemetry processing to analyze power consumption patterns of transmission energy cost for each of the plurality of IoT devices.

At step 315, the transmission energy manager 100 may use a central compute engine to determine a plurality of transmission features associated with the plurality of devices with minimal transmission energy cost. The transmission energy manager 100 may analyze correlation of the transmission metadata 112 with the geolocation of wireless infrastructure. The transmission energy manager 100 may use a regression model to predict the transmission energy cost for each of the plurality of devices within the IoT network. The transmission energy manager 100 may use a clustering model to determine the plurality of transmission features that are critical to determine transmission energy cost, such as RSSI, SNR, interference, throughput, etc. The transmission energy manager 100 may use a heuristics model to determine a subset of the plurality of IoT devices and a corresponding time when the subset of the plurality of IoT devices has minimal transmission energy consumption for Wi-Fi or cellular transmission mode. The transmission energy manager 100 may also use the heuristics model to determine the subset of the plurality of IoT devices and optimal times to maximize information transmission and minimize energy consumption for a transmission model, such as Wi-Fi or wireless, within the IoT network.

At step 320, the transmission energy manager 100 may use a transmission scheduling engine to generate a schedule to reduce a transmission energy cost for a transmission mode for the plurality of devices with the IoT network. In particular, the transmission energy manager 100 may determine optimized power consumption predictions, such as transmission mode and optimal times, for each of the plurality of IoT devices. The transmission energy manager 100 may aggregate the optimized power consumption predictions by device to generate detailed information of when and which access points on the wireless network, such as Wi-Fi AP 116, reduce their transmission power so that the subset of the plurality of IoT devices default to using 5G transmission.

At step 325, the transmission energy manager 100 may use the schedule to adjust the transmission mode associated with the plurality of devices based on the schedule to achieve minimal transmission energy cost with the network. As a result, the transmission energy manager 100 may interchangeably select transmissions over Wi-Fi or cellular based on energy consumption profiles computed during transmission.

In one or more embodiments, the IoT control system 200 may share the schedule with the plurality of IoT devices so every IoT device knows what the window of transmission will be for each of the plurality of IoT devices. Likewise, the IoT control system 200 may share the schedule with 5G providers. The 5G providers may adjust transmit power so that the plurality of IoT devices may rely only on Wi-Fi for their transmissions. As a result, the schedule may be used to adjust the transmission mode associated with the subset of the plurality of devices to allow both the network infrastructure and the IoT devices to conserve energy and keep the sensing functionality prolonged without energy replenishment.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method to determine transmission modes over Wi-Fi or cellular based on energy consumption computed during transmissions for a plurality of devices within an IoT network, including the particular steps of the method of FIG. 3, this disclosure contemplates any suitable method including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
   one or more processors;
   one or more computer-readable non-transitory storage media comprising instructions that, when executed by the one or more processors, cause one or more components of the apparatus to perform operations comprising:
     receiving transmission metadata associated with a plurality of devices within an Internet of Things (IoT) network;
     measuring, using a transmission sensing component (TSC) and the transmission metadata, a transmission energy cost for each of the plurality of devices over a time period;
     determining, using a central compute engine (CCE) and the transmission energy cost for each of the plurality of devices, a plurality of transmission features associated with the plurality of devices having a transmission energy cost that is minimized;
     generating, using a transmission scheduling engine (TSE) and the plurality of transmission features, a transmission mode schedule to reduce transmission energy for the plurality of devices within the IoT network; and
     adjusting a transmission mode associated with the plurality of devices based on the transmission mode schedule.

2. The apparatus of claim 1, wherein the one or more components of the apparatus perform operations further comprising:
   sharing the transmission mode schedule with cellular providers to adjust transmit power.

3. The apparatus of claim 1, wherein the one or more components of the apparatus perform operations further comprising:
   sharing the transmission mode schedule with each of the plurality of devices within the IoT network; and
   receiving telemetry from each of the plurality of devices within the IoT network based on the transmission mode schedule.

4. The apparatus of claim 1, wherein the transmission mode is selected from the group consisting of a Wi-Fi transmission mode and a cellular transmission mode.

5. The apparatus of claim 1, wherein the transmission metadata includes received signal strength indicator (RSSI), signal to noise ratio (SNR), interference, and throughput.

6. The apparatus of claim 1, wherein the CCE comprises a first machine learning model to predict the transmission energy cost for each of the plurality of devices within the IoT network using the transmission metadata, wherein the one or more components of the apparatus perform operations further comprising:
   predicting, using the first machine learning model, the transmission energy cost for each of the plurality of devices within the IoT network using the transmission metadata.

7. The apparatus of claim 1, wherein the CCE comprises a second machine learning model to determine the plurality of transmission features associated with the plurality of devices using the transmission energy cost for each of the plurality of devices, wherein the one or more components of the apparatus perform operations further comprising:
   determining, using the second machine learning model, the plurality of transmission features associated with the plurality of devices within the IoT network using the transmission energy cost for each of the plurality of devices.

8. The apparatus of claim 1, wherein the transmission mode schedule comprises time, transmission mode, and geolocation of each of the plurality of devices within the IoT network to reduce the transmission energy cost when the plurality of devices on the IoT network use a Wi-Fi transmission mode.

9. The apparatus of claim 1, wherein the transmission mode schedule comprises time, transmission mode, and geolocation of each of the plurality of devices within the IoT network to reduce the transmission energy cost when the plurality of devices on the IoT network use a cellular transmission mode.

10. The apparatus of claim 1, further comprising:
    using the transmission mode schedule for beamforming technology to focus on specific IoT devices based on requirements for gathering data.

11. A computer-implemented method, comprising:
    receiving transmission metadata associated with a plurality of devices within an Internet of Things (IoT) network;
    measuring, using a transmission sensing component (TSC) and the transmission metadata, transmission energy cost for each of the plurality of devices over a time period;
    determining, using a central compute engine (CCE) and the transmission energy cost for each of the plurality of devices, a plurality of transmission features associated with the plurality of devices having a transmission energy cost that is minimized;
    generating, using a transmission scheduling engine (TSE) and the plurality of transmission features, a transmission mode schedule to reduce transmission energy for the plurality of devices within the IoT network; and
    adjusting a transmission mode associated with the plurality of devices based on the transmission mode schedule.

12. The computer-implemented method of claim 11, further comprising:
    sharing the transmission mode schedule with cellular providers to adjust transmit power.

13. The computer-implemented method of claim 11, further comprising:
    sharing the transmission mode schedule with each of the plurality of devices within the IoT network; and
    receiving telemetry from each of the plurality of devices within the IoT network based on the transmission mode schedule.

14. The computer-implemented method of claim 11, wherein the transmission mode is selected from the group consisting of a Wi-Fi transmission mode and a cellular transmission mode.

15. The computer-implemented method of claim 11, wherein the transmission metadata includes received signal strength indicator (RSSI), signal to noise ratio (SNR), interference, and throughput.

16. The computer-implemented method of claim 11, wherein the CCE comprises a first machine learning model to predict the transmission energy cost for each of the plurality of devices within the IoT network using the transmission metadata.

17. The computer-implemented method of claim 11, wherein the CCE comprises a second machine learning model to determine the plurality of transmission features associated with the plurality of devices using the transmission energy cost for each of the plurality of devices.

18. The computer-implemented method of claim 11, wherein the transmission mode schedule comprises time, transmission mode, and geolocation of each of the plurality of devices within the IoT network to reduce the transmission energy cost.

19. The computer-implemented method of claim 11, further comprising:

using the transmission mode schedule for beamforming technology to focus on specific IoT devices based on requirements for gathering data.

20. A non-transitory computer-readable medium comprising instructions that are configured, when executed by a processor, to:

receive transmission metadata associated with a plurality of devices within an Internet of Things (IoT) network;

measure, using a transmission sensing component (TSC) and the transmission metadata, transmission energy cost for each of the plurality of devices over a time period;

determine, using a central compute engine (CCE) and the transmission energy cost for each of the plurality of devices, a plurality of transmission features associated with the plurality of devices having a transmission energy cost that is minimized;

generate, using a transmission scheduling engine (TSE) and the plurality of transmission features, a transmission mode schedule to reduce transmission energy for the plurality of devices within the IoT network; and adjust a transmission mode associated with the plurality of devices based on the transmission mode schedule.

* * * * *